United States Patent
Kurokawa et al.

(10) Patent No.: US 6,622,814 B2
(45) Date of Patent: Sep. 23, 2003

(54) ELECTRIC POWER STEERING DEVICE

(75) Inventors: Takanori Kurokawa, Yamatokooriyama (JP); Hirokazu Arai, Yamatokooriyama (JP); Akihiko Shiina, Kashihara (JP); Masashi Kuze, Kashiwara (JP); Mitsuharu Minami, Kashiwara (JP); Hideo Matsubara, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/924,316

(22) Filed: Aug. 8, 2001

(65) Prior Publication Data

US 2002/0020578 A1 Feb. 21, 2002

(30) Foreign Application Priority Data

Aug. 8, 2000 (JP) ........................................ 2000-239841

(51) Int. Cl.[7] ................................................ B62D 5/04
(52) U.S. Cl. .......................... 180/444; 74/425; 74/443; 74/DIG. 10
(58) Field of Search ................................. 180/443, 444; 74/425, 388 PS, DIG. 10, 425.5, 426, 427, 439, 446, 445, 443, 462, 434; 264/DIG. 3

(56) References Cited

U.S. PATENT DOCUMENTS

| 3,999,445 | A | * | 12/1976 | Liautaud ...................... 74/445 |
| 5,231,886 | A | * | 8/1993 | Quirk et al. ............ 74/DIG. 10 |
| 5,445,238 | A | * | 8/1995 | Chikuma et al. ............ 180/444 |
| 5,482,128 | A | * | 1/1996 | Takaoka et al. ............. 180/444 |
| 5,722,295 | A | * | 3/1998 | Sakai et al. .................... 74/443 |
| 5,738,183 | A | * | 4/1998 | Nakajima et al. ........... 180/444 |
| 6,199,438 | B1 | * | 3/2001 | Ade et al. ...................... 74/425 |
| 6,274,074 | B1 | * | 8/2001 | Moie ........................... 74/434 |
| 2002/0056588 | A1 | * | 5/2002 | Kuze et al. ................. 180/444 |
| 2002/0112555 | A1 | * | 8/2002 | Chikaraishi et al. .... 74/388 PS |

FOREIGN PATENT DOCUMENTS

| JP | 59-126157 | A | * | 7/1984 |
| JP | 11-192955 | A | * | 7/1999 |

* cited by examiner

*Primary Examiner*—Anne Marie Boehler
(74) *Attorney, Agent, or Firm*—Jordan and Hamburg LLP

(57) ABSTRACT

In an electric power steering device, a driven gear of a deceleration gear mechanism for transmitting rotation of an electric actuator for generating auxiliary steering power has a gear body made of a synthetic resin material. At least the outer periphery of a metal core ring is covered by the gear body. The gear body is molded and integrated with the core ring by injecting synthetic resin material into a mold, in which the core ring is inserted. A plurality of teeth, each of which has faces which run in the direction of the axis of rotation of the driven gear, are formed on the outer periphery of the core ring so as to be arranged at intervals in a circumferential direction. The synthetic resin material that constitutes the gear body is filled in the spaces between the teeth of the core ring.

20 Claims, 6 Drawing Sheets

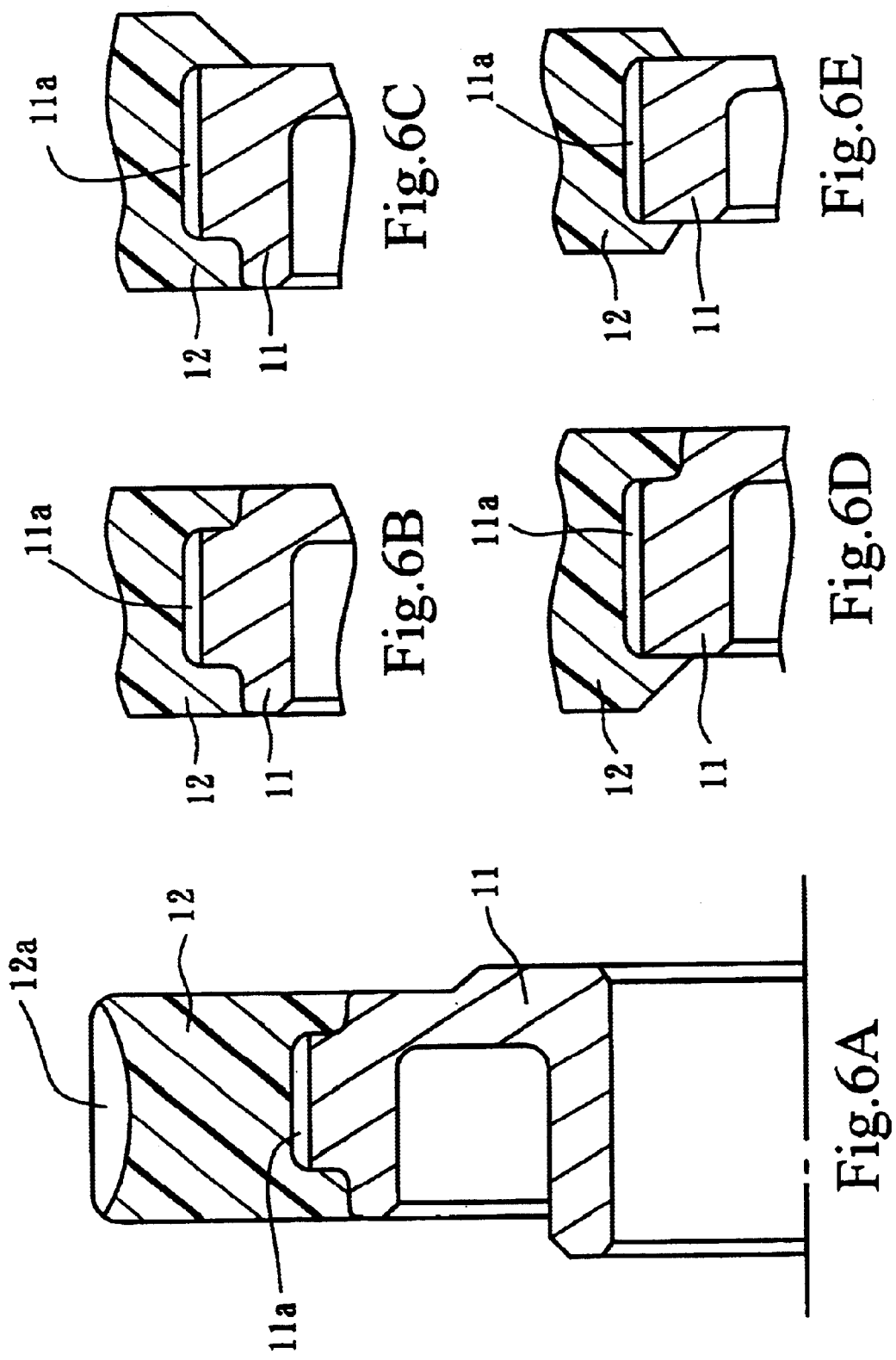

ELECTRIC POWER STEERING DEVICE

FIELD OF THE INVENTION

The present invention relates to an electric power steering device, which transmits rotation of an electric actuator for generating auxiliary steering power to wheels via a deceleration gear mechanism, which has a driving gear such as a worm and a driven gear such as a worm wheel which meshes with the driving gear.

DESCRIPTION OF THE RELATED ART

There is a demand to lighten the weight and reduce the noise of an electric power steering device that transmits rotation of an electric actuator for generating auxiliary steering power to wheels via a deceleration gear mechanism.

In this regard, in relatively light automobiles, the driven gear that constitutes the deceleration gear mechanism is constituted of a metal core ring and a gear body made of a synthetic resin material, in which the outer periphery of the core ring is covered by the gear body. Synthetic resin material is injected into a mold, in which the core ring is inserted, so that the gear body is molded and integrated with the core ring.

In recent years, there has been a demand also in large vehicles for electric power steering devices that employ a deceleration gear mechanism having a gear body made of a synthetic resin material, and endeavors have been made to increase the strength, wear resistance and life of the gear body. With regard to increasing the strength, wear resistance and life of the gear body, a discovery was made by the present inventors that effective results can be obtained by increasing the viscosity of the synthetic resin material which constitutes the gear body without using reinforcing fibers or similar.

However, increasing the viscosity of the synthetic resin material leads to a reduction in the fluidity of the synthetic resin material inside the mold and in turn a tendency for voids (air cells), weld mark, or cracks to occur, and the strength is decreased. Further, due to a high rate of post-molding shrinkage of synthetic resin material which has not been filled with reinforcing fibers or similar, there is a risk of residual stress being concentrated in certain portions which causes damage, and generates ununiformity in the strength of the gear body.

It is an object of the present invention to provide an electric power steering device that is capable of resolving the above-mentioned problems.

SUMMARY OF THE INVENTION

The present invention is an electric power steering device which comprises a deceleration gear mechanism that transmits rotation of an electric actuator for generating auxiliary steering power to a wheels via a driving gear and a driven gear that meshes with the driving gear, wherein the driven gear has a metal core ring and a gear body made of synthetic resin material, in which at least the outer periphery of the core ring is covered by the gear body, the gear body is molded and integrated with the core ring by injecting synthetic resin material into a mold, in which the core ring is inserted, a plurality of teeth having faces, which run in the direction of the axis of rotation of the driven gear, are formed on the outer periphery of the core ring so as to be arranged at intervals in a circumferential direction, and the synthetic resin material which constitutes the gear body is filled in the spaces between the teeth of the core ring.

With a constitution of the present invention, since synthetic resin material that constitutes the gear body is filled in the spaces between the plurality of teeth formed on the outer periphery of the core ring, it is possible to reliably prevent the gear body from turning with respect to the core ring. In addition, the faces of the teeth of the core ring run in the direction of the axis of rotation of the driven gear, so that a favorable degree of fluidity of the synthetic resin material is possible in the mold in which the core ring is inserted. As a result, the occurrence of voids, weld mark, cracks and so forth can be prevented, and hence the strength of the gear body can be increased. Each of the teeth of the core ring have an involute tooth shape, for example.

The module of the teeth of the core ring is preferably made smaller than the module of the teeth of the gear body.

Consequently, rotational force of the electric actuator for generating auxiliary steering power can be received not only by the teeth of the core ring but also by the teeth of the gear body.

It is preferable that the end faces of each of the teeth of the core ring are covered by the synthetic resin material that constitutes the gear body, so that the boundary sections between the crest and the end faces of each of the teeth of the core ring are covered by the synthetic resin material, and at least one of the boundary sections of each of the teeth of the core ring is formed as a convex curved face.

Accordingly, the end faces of the teeth of the core ring are covered by synthetic resin material that constitutes the gear body, so that the gear body is prevented from sliding with respect to the core ring in the direction of the axis of rotation of the driven gear. Although the boundary sections between the crest and the end faces of each of the teeth of the core ring are covered by the synthetic resin material, at least one of the boundary sections of each of the teeth of the core ring is formed as a convex curved face, and thus the concentration of residual stress on the boundary section due to shrinkage of the synthetic resin material is relaxed, thus making it possible to prevent ununiformity in the strength of the gear body.

When the radius of curvature of each convex curved face is made greater than the module of the teeth of the core ring, the concentration of residual stress on the end portions of the teeth in which the boundary sections are disposed can be reliably relaxed.

It is preferable that a runner, which is used for injecting synthetic resin material that constitutes the gear body into the mold, is disposed on only one end face of the gear body, and each convex curved face of the teeth of the core ring is formed at least in the boundary section to which the runner faces.

Accordingly, synthetic resin material is not injected from a plurality of runners but injected from only one runner into the mold, and therefore no portions of the gear body are molded through confluence of synthetic resin material, so that a gear body of uniform quality can be molded and reduction in strength of the gear body can be prevented. Furthermore, when the runner is disposed on only one end face of the gear body, the residual stress on the boundary section in the one end face of the gear body is greater than that in the other end face, due to shrinkage of synthetic resin material inside the runner. In this case, since the above-mentioned each convex curved face of the teeth of the core ring is formed at least in the boundary section to which the runner faces, a concentration of residual stress can be effectively relaxed.

According to the present invention, an electric power steering device can be provided in which, when the driven gear of the deceleration gear mechanism for transmitting rotation of an electric actuator for generating auxiliary steering power has a metal core ring covered by the gear body made of synthetic resin material, an increase in the strength, wear resistance and life of the gear body is attainable and sliding of the gear body with respect to the core ring can be prevented. Further, any reduction in strength caused by internal defect and any non-uniformity in the strength caused by residual stress in the gear body can be prevented.

BRIEF DESCRIPTION OF THE DRAWINGS

FIGS. 6A, 6B, 6C, 6D and 6E are partial cross-sectional views of a worm wheel relating to modified examples of the embodiment of the present invention.

DESCRIPTION OF THE PREFERRED EMBODIMENT

Figure 1:
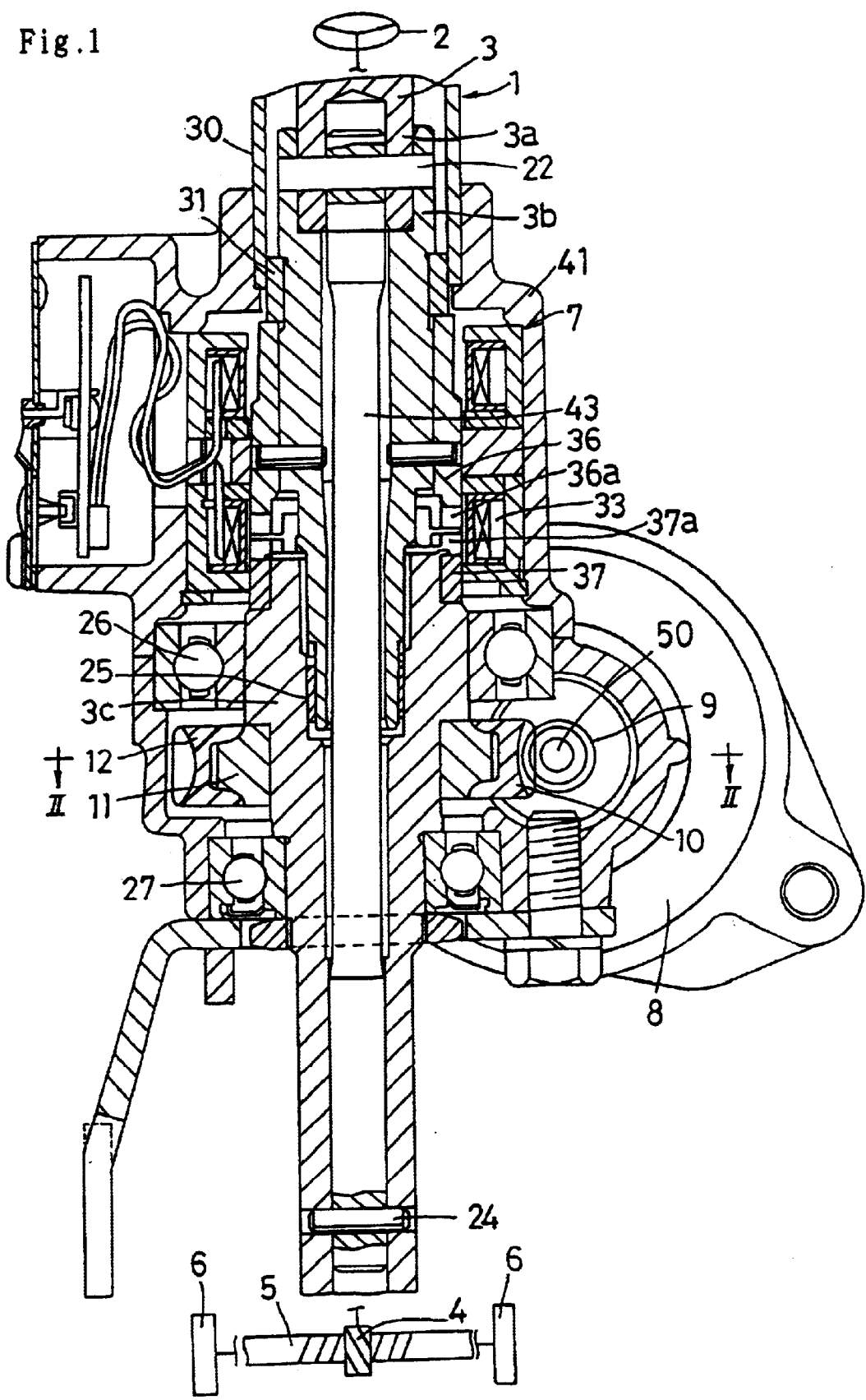
FIG. 1 is a cross-sectional view of an electric power steering device of an embodiment of the present invention.

The electric power steering device 1 shown in FIG. 1 transmits steering torque, which is generated by the operation of a steering wheel 2, to a pinion 4 by means of a steering shaft 3, so that a rack 5 meshed with the pinion 4 is moved. The steering angle is varied by transmitting the movement of the rack 5 to wheels 6 via tie rods, knuckle arms, or the like (omitted from the drawings).

Figure 2:
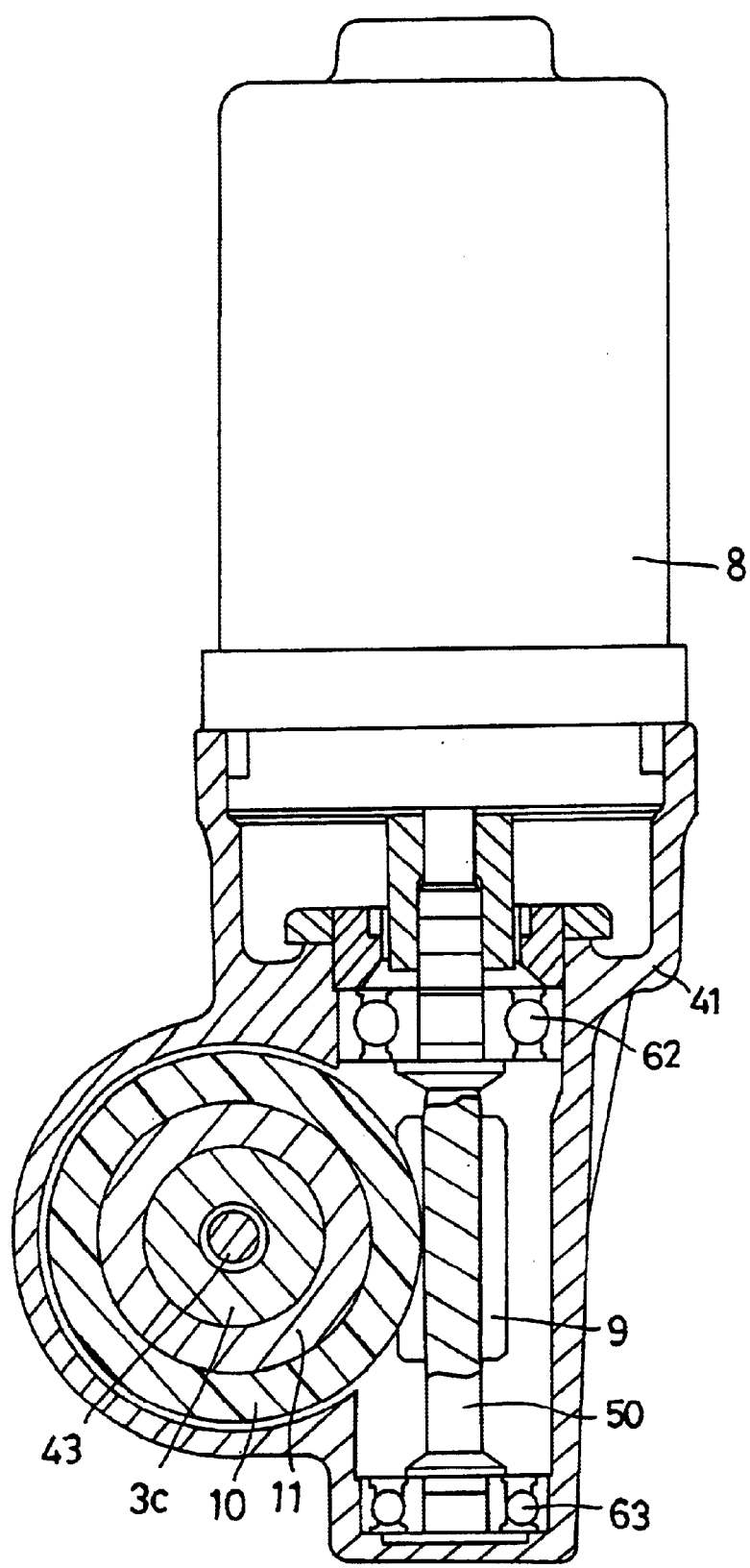
FIG. 2 is a sectional view taken along line II—II of FIG. 1.

In order to provide auxiliary steering power according to the steering torque transmitted by the steering shaft 3, the electric power steering device 1 is provided with a torque sensor 7 that detects the steering torque, a motor (an electric actuator for generating auxiliary steering power) 8 which is driven according to the steering torque detected, a metal worm 9 (driving gear) which is provided on the outer periphery of the drive shaft 50 driven by the motor 8, and a worm wheel (driven gear) 10 which meshes with the worm 9 and is mounted on the steering shaft 3. Auxiliary steering power can be provided by transmitting the rotation of the motor 8 from the steering shaft 3 to the wheels 6 via the worm 9 and the worm wheel 10. The worm 9 and worm wheel 10 constitute a deceleration gear mechanism that transmits the rotation of the motor 8 to the wheels 6. As shown in FIG. 2, the drive shaft 50, that is driven by the motor 8 mounted in a housing 41, is supported by the housing 41 via bearings 62, 63.

The steering shaft 3 is divided up into a first shaft 3a which is connected to the steering wheel 2, a tubular second shaft 3b which is connected to the first shaft 3a by a pin 22, and a tubular third shaft 3c which is fitted to the outer periphery of the second shaft 3b via a bushing 25 so as to be capable of rotation relative to the second shaft 3b. A torsion bar 43, which is an elastic member, is inserted into each of the shafts 3a, 3b and 3c so as to run through the centers thereof. One end of the torsion bar 43 is connected to the first shaft 3a and the second shaft 3b by the above-mentioned pin 22, and the other end is connected to the third shaft 3c by a pin 24. As a result, the second shaft 3b and the third shaft 3c are able to rotate elastically relative to each other according to the steering torque.

The second shaft 3b is supported by a steering column 30, which is press-fitted into the housing 41, via a bushing 31. The third shaft 3c is supported by the housing 41 via bearings 26, 27. The above-mentioned worm wheel 10 is integral with the outer periphery of the third shaft 3c. The worm wheel 10 may be press-fitted onto the third shaft 3c or affixed thereto by using a key or the like.

The torque sensor 7 has a first detection ring 36 which is made of a magnetic material and affixed to the second shaft 3b, a second detection ring 37 which is made of a magnetic material and affixed to the third shaft 3c, and a detection coil 33 that covers the space between both detection rings 36 and 37. A plurality of teeth 36a are provided in a circumferential direction on an end face of the first detection ring 36 and a plurality of teeth 37a are provided in a circumferential direction on an end face of the second detection ring 37. The surface area, where the teeth 36a and teeth 37a face to each other, varies by the elastic relative rotation between the second shaft 3b and third shaft 3c according to the steering torque. Since the magnetic resistance to the magnetic flux generated in the detection coil 33 varies according to the variation in the surface area, the steering torque can be detected on the basis of the output from the detection coil 33. A torque sensor of a commonly known constitution can be used for the torque sensor 7. The above-mentioned motor 8 is driven according to a signal corresponding to the steering torque detected, and the rotation of the motor 8 is transmitted to the steering shaft 3 via worm 9 and worm wheel 10.

Figure 3A:
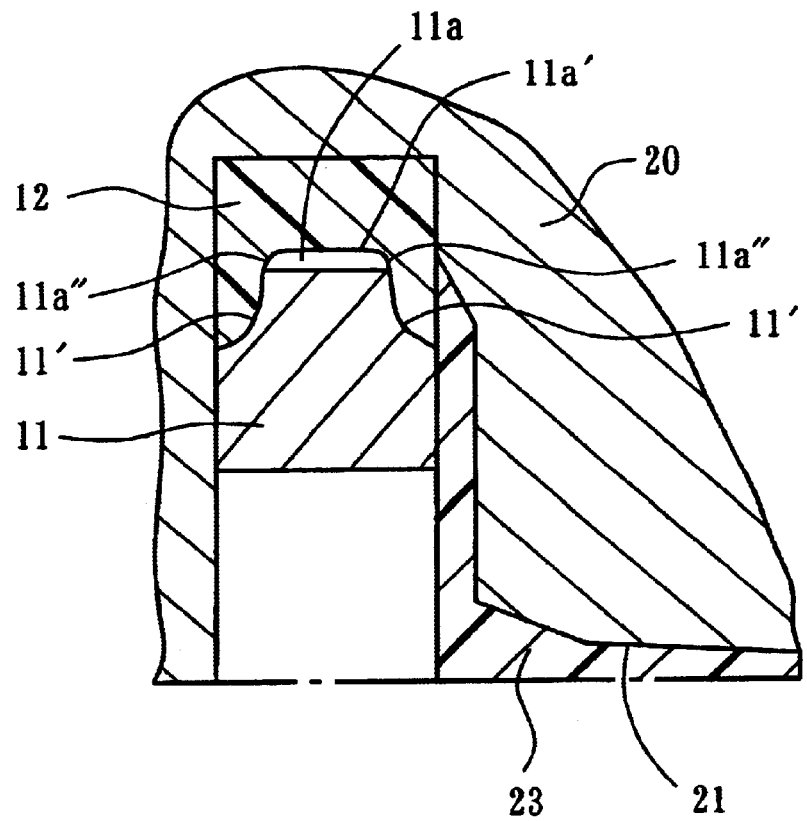
FIG. 3A shows a method of molding a worm wheel according to the embodiment of the present invention.
Figure 3B:
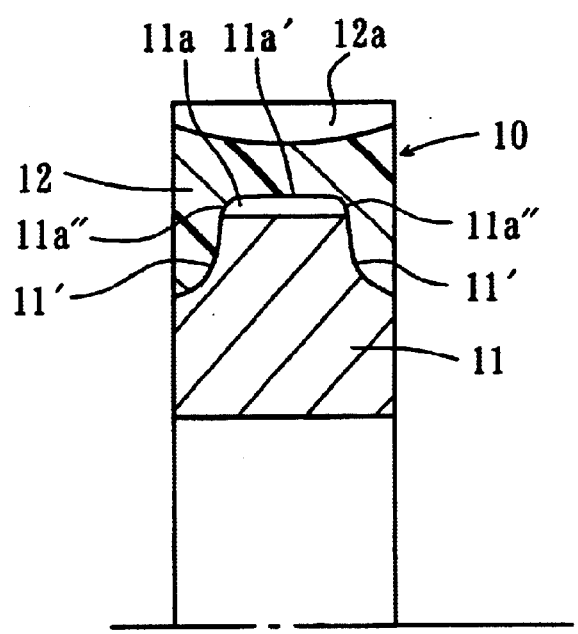
FIG. 3B is a cross-sectional view of the principal parts of this worm wheel.

The worm wheel 10 has a metal core ring 11 and a gear body 12 made of synthetic resin material. At least the outer periphery of the core ring 11 is covered by the gear body 12. The gear body 12 is molded and integrated with the core ring 11 by injecting synthetic resin material into a mold, in which the core ring 11 is inserted, in an injection molding process. As shown in FIG. 3A, according to the present embodiment, a runner 21, which is used for injecting synthetic resin material that constitutes the gear body 12 into the mold 20, is disposed on only one end face of the gear body 12. Following molding, as shown in FIG. 3B, the synthetic resin material 23, with which the runner 21 has been filled, is removed, and the worm wheel 10 is finished by forming teeth 12a on the gear body 12. The synthetic resin material is a nylon synthetic resin material such as PA(polyamide)6, PA66, PA46, PA11, PA12, PPA (polyparabanic acid), PA6T or PA6•6T, and is a pure material, that is, into which no other material has been filled.

Figure 4:
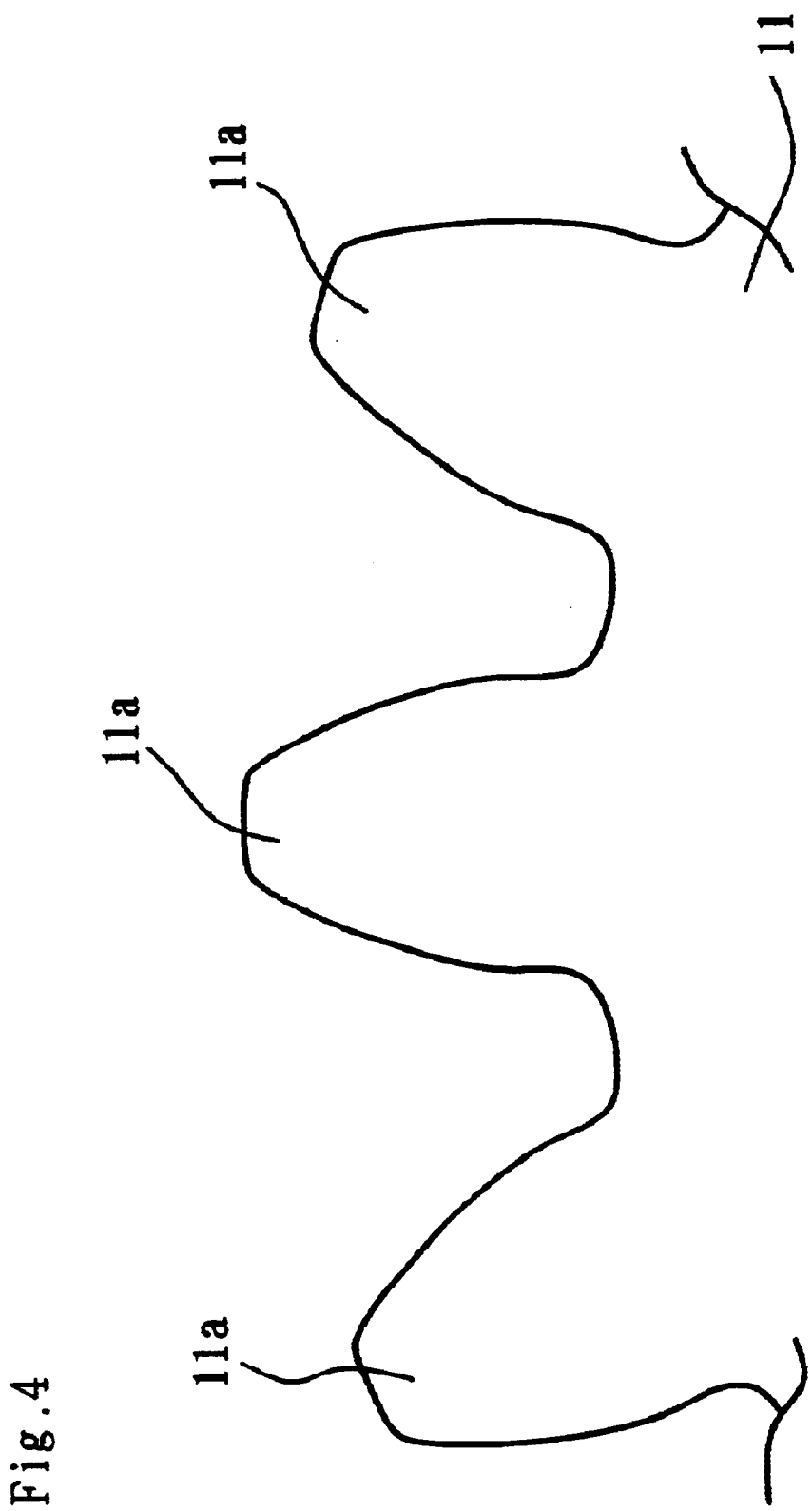
FIG. 4 is a partial front elevation of the teeth of the core ring according to an embodiment of the present invention.
Figure 5A:
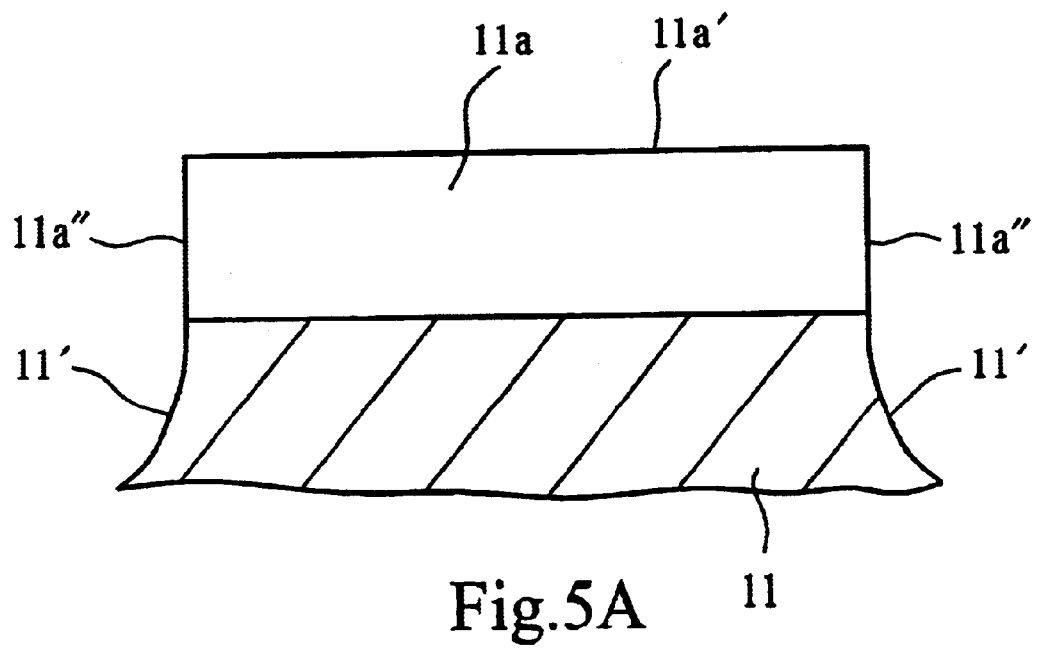
FIG. 5A is a cross-sectional view showing a state during molding of the core ring according to the embodiment of the present invention.
Figure 5B:
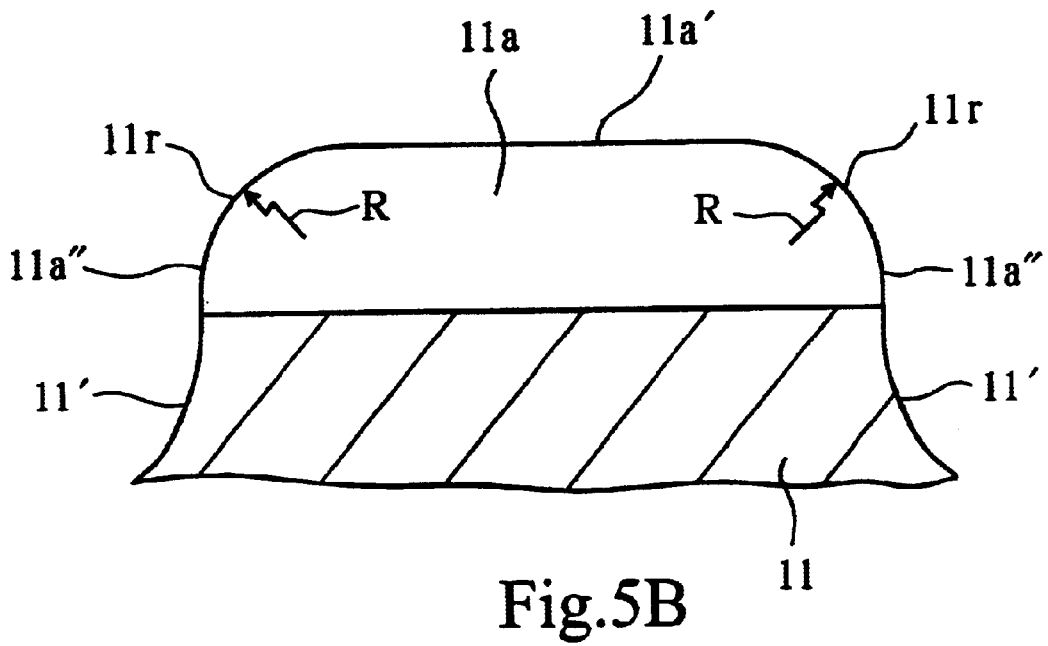
FIG. 5B is a partial cross-sectional view of this core ring.

As shown in FIG. 4 and FIG. 5, a plurality of teeth 11a having faces, which run in the direction of the axis of rotation of the worm wheel 10, are formed on the outer periphery of the core ring 11 so as to be arranged at intervals in a circumferential direction. The width of the outer peripheral portion, where the teeth 11a are formed, is made smaller than that of the inner peripheral portion of the core ring 11, such that a shoulder 11' is formed whose width gradually changes in the portion between the teeth 11a and the inner peripheral portion. Each of the teeth 11a of the present embodiment has an involute tooth shape. The synthetic resin material, that constitutes the above-mentioned gear body 12, is filled in the spaces between the teeth 11a of the core ring 11. The shoulder 11' and also the end faces 11a" of each of the teeth 11a of the core ring 11 are covered by the synthetic resin material that constitutes the gear body 12.

After formation of the teeth 11a on the core ring 11 as shown in FIG. 5A, the boundary sections between the crest 11a' and both end faces 11a" of each of the teeth 11a of the core ring 11 are each formed as a convex curved face 11r by machining, and the boundary sections are covered by the synthetic resin material that constitutes the gear body 12. The radius of curvature R of each convex curved face 11r is made greater than the module of the teeth 11a of the core ring 11. The module of the teeth 11a of the core ring 11 is made smaller than the module of the teeth 12a of the gear body 12. Each convex curved face 11r of the teeth 11 a of the core ring 11 may be formed in only the boundary section to which the runner 21 faces.

According to the constitution mentioned above, since synthetic resin material that constitutes the gear body 12 is filled in the spaces between the plurality of teeth 11a formed on the outer periphery of the core ring 11, it is possible to reliably prevent the gear body 12 from turning with respect to the core ring 11. In addition, the faces of the teeth 11a of the core ring 11 run in the direction of the axis of rotation of the worm wheel 10, so that a favorable degree of fluidity of the synthetic resin material is possible in the mold 20 in which the core ring 11 is inserted. As a result, the occurrence of voids, weld mark, cracks, and the like can be prevented, and hence the strength of the gear body 12 can be increased.

The module of the teeth 11a of the core ring 11 is made smaller than the module of the teeth 12a of the gear body 12. Consequently, the rotational force of the motor 8 can be received not only by the teeth 11a of the core ring 11 but also by the teeth 12a of the gear body 12.

The end faces 11a" of each of the teeth 11a of the core ring 11 are covered by synthetic resin material that constitutes the gear body 12, whereby the gear body 12 is prevented from sliding with respect to the core ring 11 in the direction of the axis of rotation of the worm wheel 10. Although the boundary sections between the crest 11a' and end faces 11a" of each of the teeth 11a of the core ring 11 are covered by the synthetic resin material, the boundary sections are formed as convex curved faces 11r, and thus the concentration of residual stress on the boundary sections due to shrinkage of the synthetic resin material is relaxed, thus making it possible to prevent non-uniformity in the strength of the gear body 12. The radius of curvature R of each of the convex curved faces 11r is greater than the module of the teeth 11a of the core ring 11, whereby the concentration of residual stress on the end portions of the teeth 11a in which the boundary sections are disposed can be reliably relaxed because the addendum of the teeth 11a is equal to the module of full depth teeth.

The fact that synthetic resin material is not injected from a plurality of runners but injected from only one runner 21 into the mold 20 to mold the gear body 12, and therefore no portions of the gear body 12 are molded through confluence of synthetic resin material, so that a gear body 12 of uniform quality can be molded and reduction in strength of the gear body 12 can be prevented. Furthermore, when the runner 21 is disposed on only one end face of the gear body 12, due to shrinkage of the synthetic resin material inside the runner 21, the residual stress on the boundary section in the one end face of the gear body 12 is greater than that in the other end face. In this case, since the above-mentioned each convex curved face 11r of the teeth 11a of the core ring 11 is formed at least in the boundary section to which the runner 21 faces, a concentration of residual stress can be effectively relaxed.

The present invention is not limited to the above-mentioned embodiment. For example, the shape of the worm wheel 10 may also be a shape shown in the modified examples of FIGS. 6A, 6B, 6C, 6D and 6E. In the modified examples, the same symbols are used to denote parts like those of the above-mentioned embodiments. Furthermore, the driving gear and driven gear are not limited to being a worm and worm wheel respectively, but may each be constituted by bevel gears, for example.

What is claimed is:

1. An electric power steering device, comprising:
   a driving gear; and
   a driven gear which meshes with said driving gear,
   said driven gear having a metal core ring and a gear body made of synthetic resin material, at least an outer periphery of said core ring being covered by said gear body;
   said gear body being molded and integrated with said core ring by injecting synthetic resin material into a mold in which said core ring is inserted;
   a plurality of teeth having faces being formed on the outer periphery of said core ring so as to be arranged at intervals in a circumferential direction;
   the entire spaces between said teeth of said core ring being filled by the synthetic resin material;
   said teeth of said core ring having a module smaller than a module of said teeth of said gear body.

2. The electric power steering device according to claim 1, wherein end faces of each of said teeth of said core ring are covered by the synthetic resin material that constitutes said gear body, so that boundary sections between a crest and the end faces of each of said teeth of said core ring are covered by the synthetic resin material; and
   at least one of the boundary sections of each of said teeth of said core ring is formed as a convex curved face.

3. The electric power steering device according to claim 2, wherein a radius of curvature of each convex curved face is greater than the module of said teeth of said core ring.

4. The electric power steering device according to claim 3, wherein a runner, which is used for injecting synthetic resin material that constitutes said gear body into said mold, is disposed on only one end face of said gear body, and each convex curved face of said teeth of said core ring is formed at least in said boundary section to which the runner faces.

5. The electric power steering device according to claim 2, wherein a runner, which is used for injecting synthetic resin material that constitutes said gear body into said mold, is disposed on only one end face of said gear body, and each convex curved face of said teeth of said core ring is formed at least in said boundary section to which the runner faces.

6. The electric power steering device according to claim 1, wherein said teeth include faces which are oriented in a direction of an axis of rotation of said driven gear.

7. The electric power steering device according to claim 1, wherein a width of an outer peripheral portion of said core ring where said teeth are formed is smaller than a width of an inner peripheral portion of said core ring.

8. The electric power steering device according to claim 7, wherein said teeth include shoulders between the outer peripheral portion of said core ring where said teeth are formed and said inner peripheral portion of said core ring, said shoulders having a width which varies between said teeth and said inner peripheral portion of said core ring.

9. The electric power steering device according to claim 8, wherein said shoulders are covered by said gear body.

10. An electric power steering device, comprising:
    a driving gear; and
    a driven gear which meshes with said driving gear, said driven gear having a metal core-ring and a gear body made of synthetic resin material, at least an outer periphery of said core ring being covered by said gear body;

said gear body being molded and integrated with said core ring by injecting synthetic resin material into a mold in which said core ring is inserted;

a plurality of teeth having laces being formed on the outer periphery of said core ring so as to be arranged at intervals in a circumferential direction;

the synthetic resin material that constitutes said gear body being filled in spaces between said teeth of said core ring;

end faces of each of said teeth of said core ring being covered by the synthetic resin material that constitutes said gear body so that boundary sections between a crest and the end faces of each of said teeth of said core ring are covered by the synthetic resin material; and at least one of the boundary sections of each of said teeth of said core ring being formed as a convex curved face, a radius of curvature of each convex curved face being greater than a module of said teeth of said core ring.

11. The electric power steering device according to claim 10, wherein a runner, which is used for injecting synthetic resin material that constitutes said gear body into said mold, is disposed on only one end face of said gear body, and each convex curved face of said teeth of said core ring is formed at least in said boundary section to which the runner faces.

12. The electric power steering device according to claim 10, wherein a runner, which is used for injecting synthetic resin material that constitutes said gear body into said mold, is disposed on only one end face of said gear body, and each convex curved face of said teeth of said core ring is formed at least in said boundary section to which the runner faces.

13. The electric power steering device according to claim 10, wherein said teeth include faces which are oriented in a direction of an axis of rotation of said driven gear.

14. The electric power steering device according to claim 10, wherein a width of an outer peripheral portion of said core ring where said teeth formed is smaller than a width of an inner peripheral portion of said core ring.

15. The electric power steering device according to claim 14, wherein said teeth include shoulders between the outer peripheral portion of said core ring where said teeth are formed and said inner peripheral portion of said core ring, said shoulders having a width which varies between said teeth and said inner peripheral portion of said core ring.

16. The electric power steering device according to claim 15, wherein said shoulders are covered by said gear body.

17. An injection-molded gear for an electric power steering device, comprising:

a metal core ring having a plurality of teeth having faces formed on an outer periphery and arranged at intervals in a circumferential direction; and a gear body made of synthetic resin material, at least an outer periphery of said core ring being covered by said gear body and the entire spaces between said teeth of said core ring being filled by the synthetic resin material, said teeth of said core ring having a module smaller than a module of said teeth of said gear body.

18. The injection-molded gear according to claim 17, wherein end faces of each of said teeth of said core ring are covered by the synthetic resin material so that boundary sections between a crest and the end faces of each of said teeth of said core ring are covered by the synthetic resin material; and at least one of the boundary sections of each of said teeth of said core ring is formed as a convex curved face.

19. The injection-molded gear according to claim 18, wherein a radius of curvature of each convex curved face is greater than a module of said teeth of said core ring.

20. The injection-molded gear according to claim 17, wherein a width of an outer peripheral portion of said core ring where said teeth are formed is smaller than a width of an inner peripheral portion of said core ring.

* * * * *